United States Patent [19]

Willey et al.

[11] Patent Number: 4,930,941
[45] Date of Patent: Jun. 5, 1990

[54] CUSTOMER TERMINAL FOR A SINGLE TUBE PNEUMATIC SYSTEM FOR BANKING AND THE LIKE

[75] Inventors: Clair L. Willey, Marion; David H. Ayer, Cedar Rapids, both of Iowa

[73] Assignee: Inter Innovation LeFebure Mfg. Corp., Cedar Rapids, Iowa

[21] Appl. No.: 274,308

[22] Filed: Nov. 21, 1988

[51] Int. Cl.⁵ .......................................... B65G 51/26
[52] U.S. Cl. ...................................... 406/10; 406/21; 406/26; 406/112
[58] Field of Search .................. 406/1, 10, 11, 13, 17, 406/21, 26, 112

[56] References Cited

U.S. PATENT DOCUMENTS

| | | |
|---|---|---|
| 681,057 | 8/1901 | Johnson . |
| 683,387 | 9/1901 | Cowley . |
| 706,639 | 8/1902 | Cowley . |
| 760,659 | 5/1904 | Stoddard . |
| 1,791,189 | 2/1931 | Burton . |
| 2,135,355 | 11/1938 | Scanlan ................................ 406/21 |
| 3,610,554 | 10/1971 | Schwarz . |
| 4,135,684 | 1/1979 | Willey ................................... 406/21 |
| 4,135,685 | 1/1979 | Girshovich et al. .................. 406/10 |
| 4,343,574 | 8/1982 | Anders .................................. 406/21 |
| 4,352,603 | 10/1982 | Anders .................................. 406/26 |

*Primary Examiner*—Sherman D. Basinger
*Assistant Examiner*—Stephen P. Avila
*Attorney, Agent, or Firm*—Simmons, Perrine, Albright and Ellwood

[57] ABSTRACT

A customer terminal for a single tube pneumatic system for banking and the like features a two-piece carrier receiver which includes a carrier tray that first moves downwardly from a stationary receiver housing and then forwardly and upwardly to present a carrier in the tray to a customer, the tray and carrier remaining parallel to the receiver housing. The tray is resiliently mounted to the mechanism which manipulates it and the joint between the tray and housing is contoured both to improve sealing between the two parts and to reduce wear on the seal itself. The air pressure/exhaust ports into the carrier chamber within the receiver are disposed between the ends of the chamber in order to provide an air cushion for reducing the shock of an arriving carrier and to prevent loose items in the system from being sucked into the blower.

9 Claims, 5 Drawing Sheets

CUSTOMER TERMINAL FOR A SINGLE TUBE PNEUMATIC SYSTEM FOR BANKING AND THE LIKE

BACKGROUND OF THE INVENTION

The invention concerns customer terminals in single tube pneumatic systems for banking or the like, and more particularly terminals in which, when the carrier receiver is open, the carrier is forwardly presented to a customer.

An approach somewhat similar to that of the present invention is found in U.S. Pat. No. 3,610,554. There the receiver includes a pair of upper and lower, semi-cylindrical trays forming in effect an extension of the pneumatic tube. The upper tray is hinged along one edge to the receiver proper and its other edge is hinged to one edge of the lower tray. When a carrier arrives in the receiver the two trays unfold about their respective hinges and at the same time move forwardly so that the lower tray presents the carrier to the customer at a position in front of the receiver.

SUMMARY OF THE INVENTION

The present invention achieves essentially the same thing as that of the foregoing patent but in a manner reducing the problem of sealing two trays to each other and to the carrier tube when the receiver is closed, as well as providing improved means for reducing the shock to the receiver when a carrier arrives within it. To that end the receiver of the present invention comprises essentially two unconnected pieces: a stationary receiver housing having the pneumatic transit tube entering one end and a bumper at its other end between which is an upper semi-cylindrical wall forming the upper half of a cylindrical chamber, the axis of the receiver being parallel to the front wall of the terminal. The lower portion of the receiver is formed by a movable tray whose upper wall forms the lower half of the carrier chamber. After a carrier arrives in the latter, the tray with the carrier on it first moves downwardly and then upwardly and forwardly of the receiver housing so that the tray and carrier are disposed in front of the receiver housing for better presentation to the customer, the tray throughout its movement remaining parallel to the receiver housing.

The tray is resiliently mounted to the machinery which manipulates it, which is an adaptation of a Geneva mechanism, so that any misalignment of the tray with the receiver housing is accommodated when the tray is in engagement with the housing to close the receiver, an appropriate seal being provided along the mating edges of the two parts. Furthermore, the joint between the receiver housing and the tray is contoured to minimize sliding movement between the seal on one part and the edge of the other part in order to reduce wear on the seal as the receiver is opened and closed.

The cylindrical wall of the receiver housing is provided with a number of small air exhaust/intake ports disposed intermediate the annular seals at the ends of a carrier when at rest in the carrier chamber. When the seal at the leading end of a carrier arriving in the carrier chamber has passed the ports, an air cushion is formed between the leading end of the carrier and the bumper at the far end of the receiver, thus slowing the carrier and lessening the shock to the receiver of its halt by the bumper.

Other features and advantages of the present invention will become apparent from the drawings and the more detailed description which follows.

DETAILED DESCRIPTION OF A PREFERRED EMBODIMENT

Figure 1:
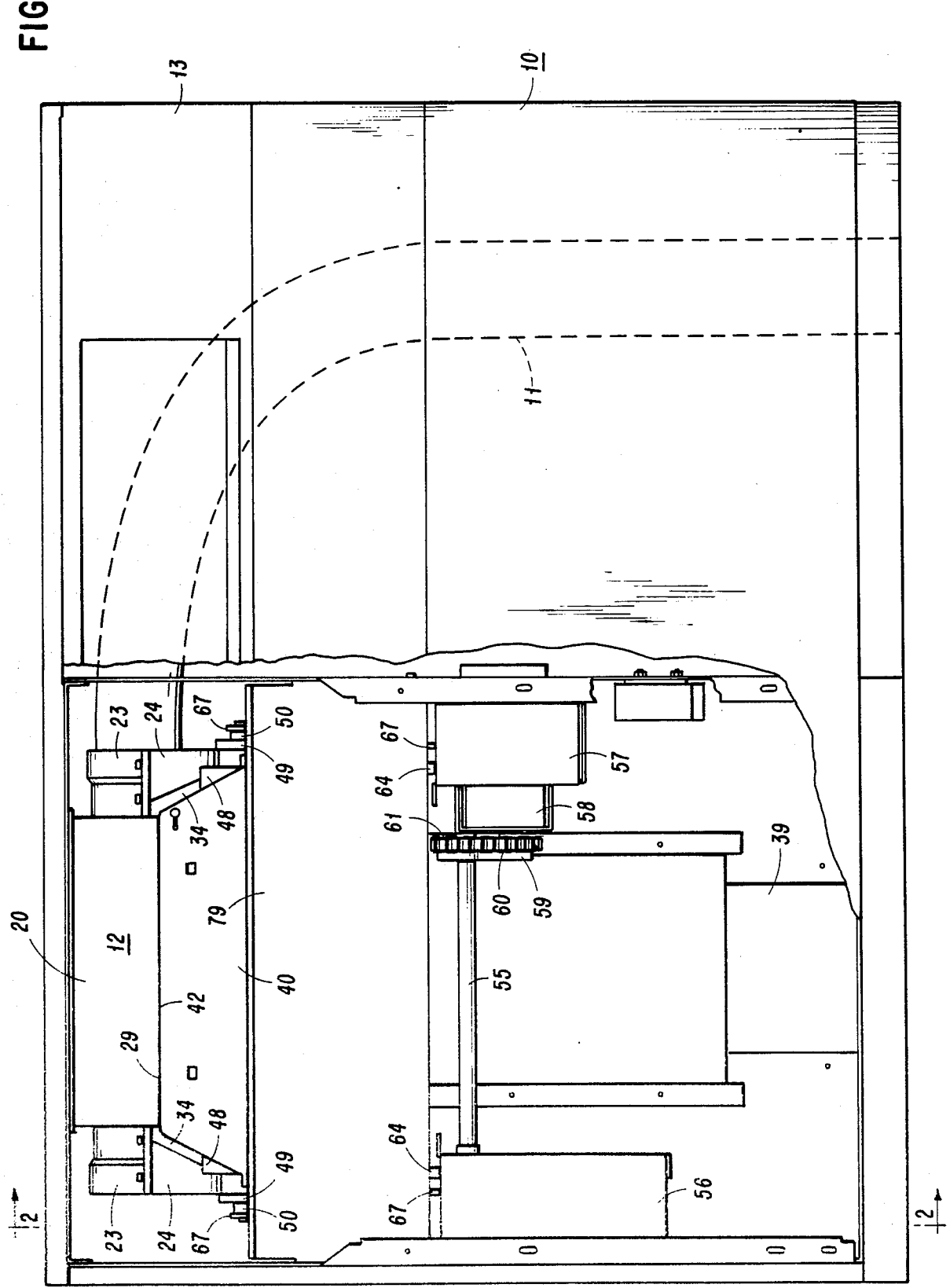
FIG. 1 is a front elevation of a customer terminal according to the invention, a portion of its outer housing being cut away to illustrate the interior of the terminal.
Figure 2:
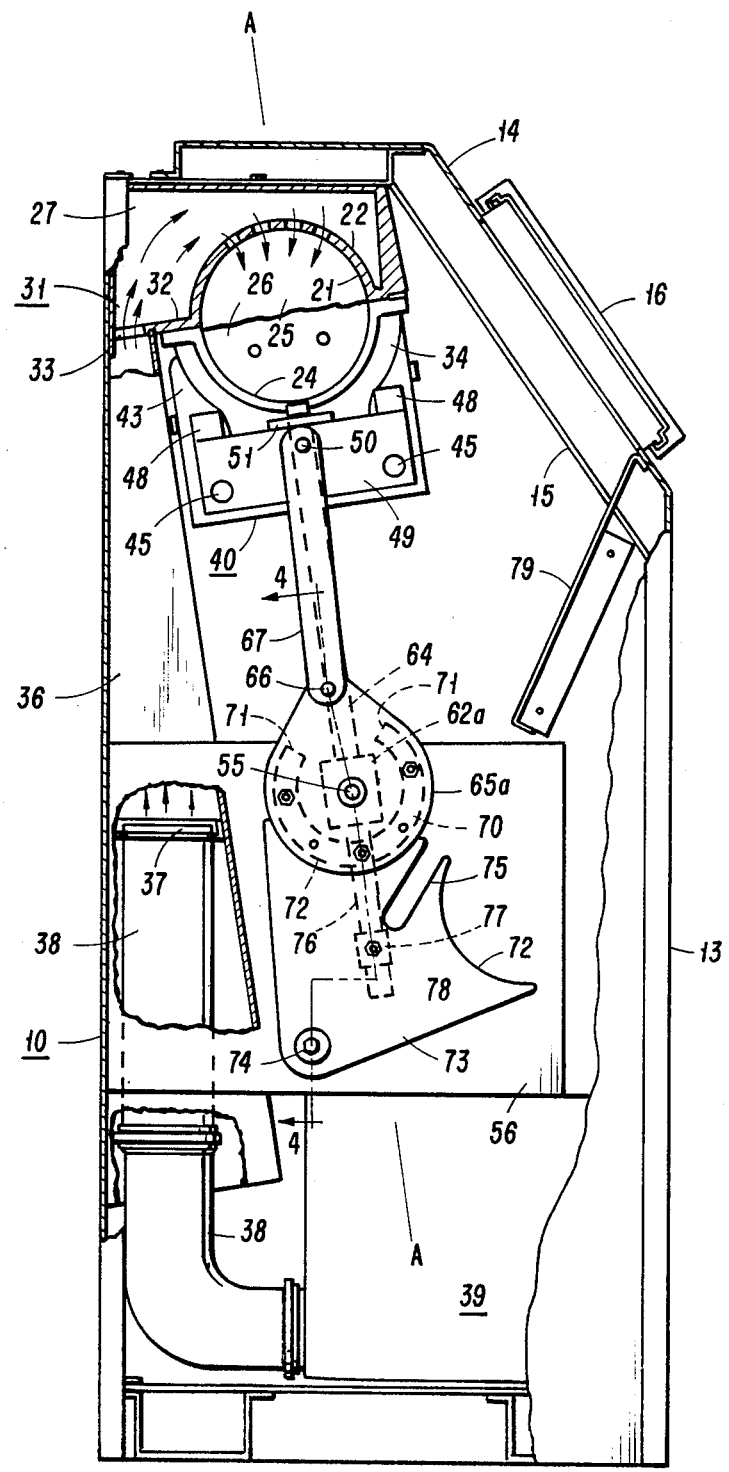
FIG. 2 is a sectional view taken along the line 2—2 of FIG. 1 and showing the carrier receiver in its closed position, certain portions being broken away to illustrate various details.

In FIGS. 1 and 2, the customer terminal includes a rectangular housing 10 enclosing inner framework, walls and panels on which the various components of the terminal are mounted in the left or right-hand half of the housing 10 depending on whether the carrier transit tube 11 enters from the left or right (as shown). The remainder of the housing 10 in either case merely encloses the entering portion of the tube 11. As shown in the drawings, the carrier receiver, generally indicated at 12, is mounted in the upper left-hand portion of the terminal, its axis being parallel to the housing front wall 13. The upper portion 14 of the latter wall is sloped and provided with an opening 15 for access to the receiver 12, the access opening 15 being opened and closed by a laterally sliding panel 16 in customary manner.

Figure 5:
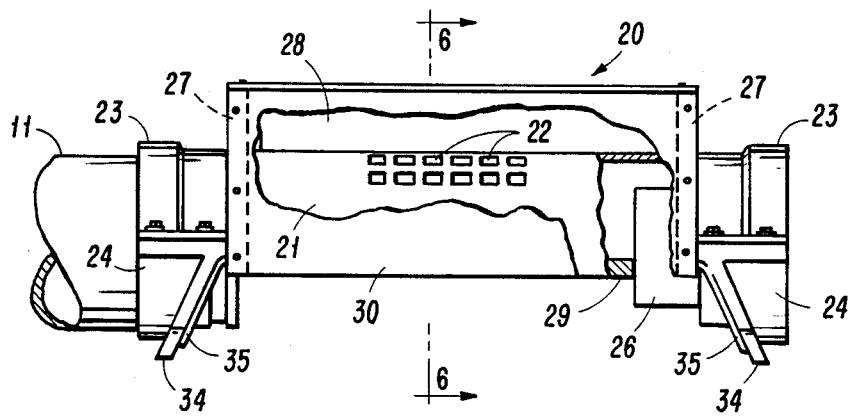
FIG. 5 is a rear elevation of the carrier housing of the invention, certain portions being further broken away to illustrate details.
Figure 6:
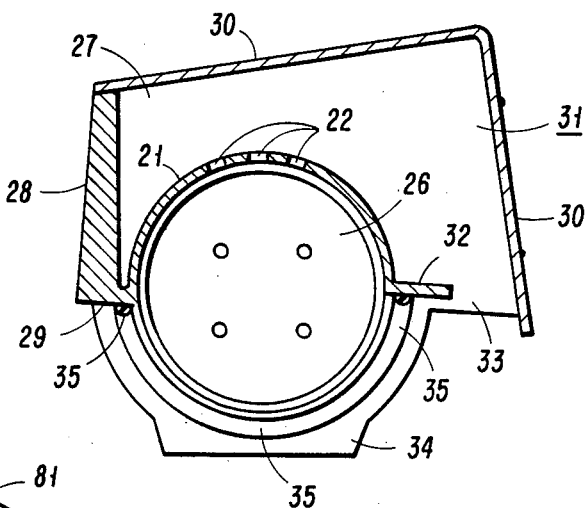
FIG. 6 is a sectional view taken along the line 6—6 of FIG. 5.

As noted, the receiver 12 consists basically of two parts, a stationary receiver housing and a carrier tray. The receiver housing 20 (see FIGS. 5 and 6) is molded of an appropriate plastic and includes a semi-cylindrical wall 21 forming the upper half of a cylindrical carrier chamber, the chamber wall 21 being provided with a multitude of small pneumatic ports 22 midway between its ends. The latter ends terminate in the upper halves 23, integral with the wall 21, of a pair of split sleeves (for easing molding of the housing 20) which are cemented to the lower halves 24 and held together by bolts while the cement dries. Into the left-hand end is spigotted the transit tube 11 and into the other is cemented a plug 25 (see FIG. 2) to which a carrier bumper 26 is bolted. The receiver housing 20 is further molded with a pair of spaced, transverse end walls 27 on its exterior adjacent the sleeve halves 23 and extending from the front of the housing 20 up and over its top to rearward thereof, as shown in FIG. 6. The lower edge of an integral front wall 28 forms an underlying flange 29 with the lower front edge of the chamber wall 21 and together with an L-shaped metal panel 30 joins the end walls 27 to provide a plenum chamber 31 on the exterior of the housing 20 about the ports 22. An integral flange 32 co-planar with the flange 29 extends rearwardly from the lower rear edge of the chamber wall 21 and with the end walls 27 and the panel 30 define a lower opening 33 into the plenum chamber 31. The lower halves 24 of the split sleeves include exterior splayed flanges 34 which form continuations of the flanges 29 and 32, the adjacent faces of the flanges 29, 32 and 34 being grooved to receive a continuous elastomeric carrier tray seal 35. The receiver housing plenum opening 33 leads down into a sheet metal duct 36 having a floor 37 through which opens an air pressure/exhaust pipe 38 from a reversible blower 39 on the floor of the housing 10.

Figure 7:
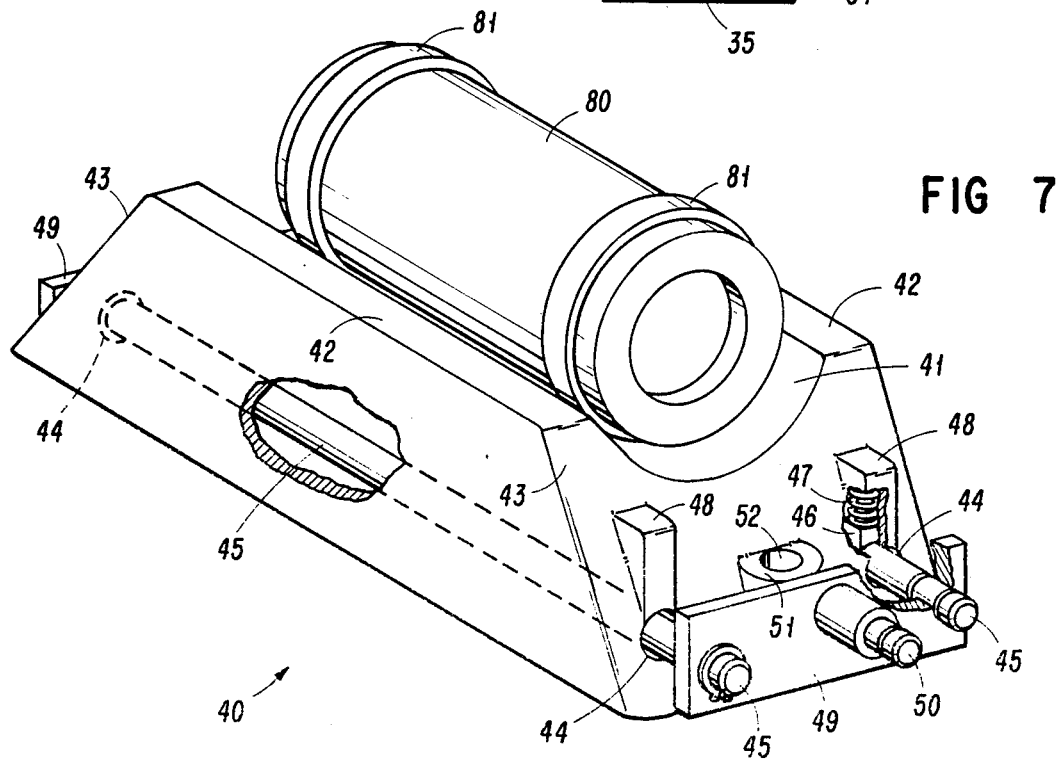
FIG. 7 is a perspective view of the carrier tray illustrating its resilient mounting.

The carrier tray 40 (see FIGS. 1, 2 and 7) is also an integral plastic molding, trapezoidal in side elevation, and provided at its top with a longitudinally extending, semicylindrical wall 41 forming the lower half of the carrier chamber when the receiver 12 is closed. The upper edges 42 of the tray 40 outboard of the wall 41 and the upper edges of the tray end walls 43 mate with the receiver housing flanges 29, 32 and 34 and bear against the seal 35 when the receiver 12 is closed. The tray 40 is hollow below the wall 41 and its sloping end walls 43 are provided with two pairs of aligned bores 44 which loosely encompass a pair of parallel tray mounting bars 45. The latter are resiliently urged downwardly by plugs 46 and coil springs 47 slidable in blind bores within integral shoulders 48 on the tray end walls 43, the axes of the plugs 46 intersecting those of the mounting bars 45 at right angles. The outer ends of the bars 45 are connected by cross plates 49 from which extend a pair of axially aligned trunions 50 parallel to the bars 45. The tray 40 and bars 45 are symmetrical with respect to a plane A—A (see FIGS. 2 and 3) through the trunions 50 and thus also through the axis of the carrier chamber. Each tray end wall 43 between the shoulders 48 is further provided with an integral boss 51 having a bore 52 whose axis lies in the foregoing plane and intersects the common axis of the trunions 50 at right angles.

Figure 3:
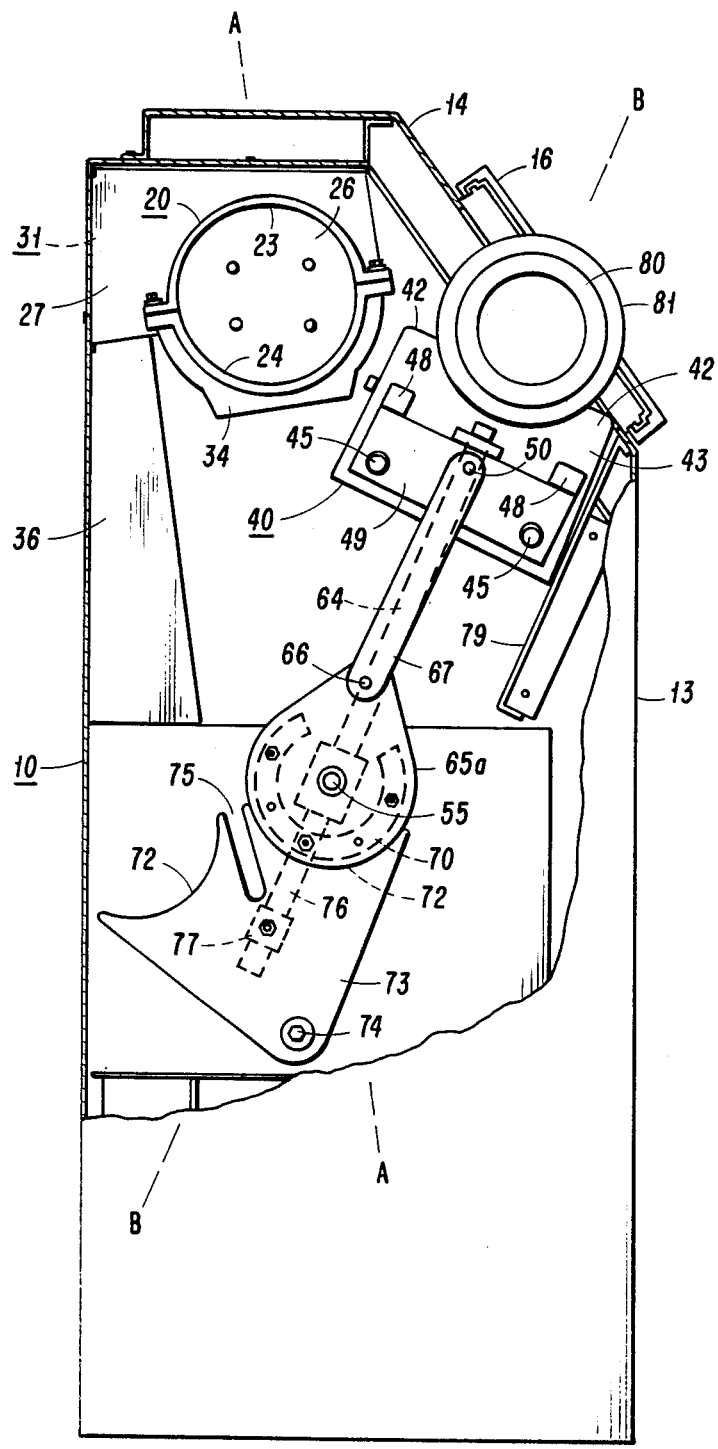
FIG. 3 is similar to FIG. 2 but showing the carrier receiver in its open position presenting a carrier.

A drive shaft 55 is mounted below the receiver 12 parallel to the trunions 50, the axis of the shaft 55 lying the plane A—A parallel to the axis of the carrier chamber. The ends of the shaft 55 are journaled in sheet metal brackets 56 and 57 (see FIGS. 1 and 4), the bracket 57 also mounting an electric motor and reduction gearbox 58 whose output shaft is fitted with a drive sprocket 59. A drive chain 60 is entrained around the sprocket 59 and a driven sprocket 61 fixed to the shaft 55 intermediate its ends. Adjacent the ends of the shaft 55 in turn are journaled a pair of bearing blocks 62a, 62b having opposite upper and lower bores 63 whose axes intersect the axis of the shaft 55 at right angles. The upper pair of bores 63 fixedly receive the lower ends of a pair of parallel tray guide bars 64 in the plane A—A whose upper ends are slidably received in the bores 52 of the two bosses 51 on the tray end walls 43. Outboard of the bearing blocks 62a, 62b a pair of parallel, identical cranks 65a, 65b, of the shape shown in FIGS. 2 and 3, are also fixed to the shaft 55 and extend upwardly therefrom. To the upper ends of the cranks 65a, 65b are pivotally attached at 66 the lower ends of a pair of parallel tray link bars 67 of equal length, the axis of the pivots 66 being parallel to that of the shaft 55 and the carrier tray trunions 50 to which the upper ends of the bars 67 are pivotally attached. One of the link bars 67 includes an actuator 68 for the limit switches controlling operation of the motor 58.

To the inboard face of the crank 65a is bolted an annular shift lever locking cam 70 centered with respect to the drive shaft 55 and interrupted at 71 symmetrically with respect to the adjacent tray guide bar 64. The peripheral surface of the cam 70 is rotatable in each of two circular recesses 72 on the periphery of a sector shaped carrier tray shift lever 73, the recesses 72 each having a radius equal to that of the cam 70 and subtended by minor chords. The shift lever 73 is pivotally attached at 74 to the bracket 56 about an axis parallel to the drive shaft 55 and the two recesses 72 are separated by a slot 75 extending radially inwards of the lever 73. A tray shift bar 76 extends down from the lower bore 63 of the bearing block 62a and is slidably received in a locating block 77 pivoted at 78 to the lever 73 about an axis parallel to that of the drive shaft 55 and disposed radially inwards of the slot 75. Finally, the pivot 66 on the crank 65a is co-axially provided with a cylindrical shift lever driver 79 in planar alignment with the lever 73 and of a diameter equal to the width of its slot 75.

Figure 4:
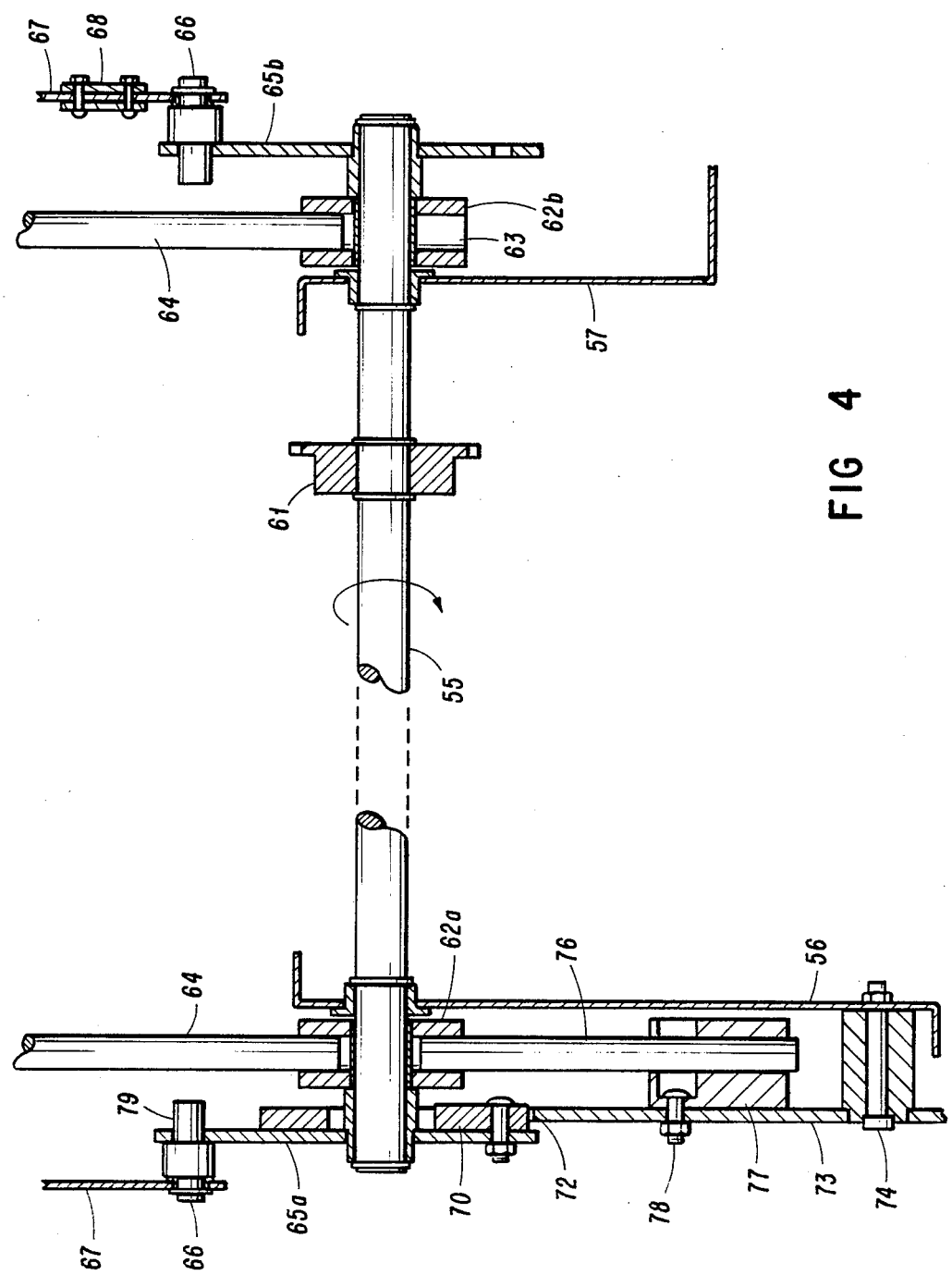
FIG. 4 is a sectional view taken along the line 4—4 of FIG. 2.

Accordingly, when the receiver 12 is closed, as shown in FIG. 2, a one-half rotation of the drive shaft 55 in the direction of the arrow in FIG. 4 causes the cranks 65a, 65b and link bars 67 to move the carrier tray 40 downwards on the guide bars 64 in the plane A—A, thus opening the receiver 12. During that movement the driver 79 engages the lever slot 75 and rotates the tray shift lever 73 about its pivot 74 in the opposite direction to that of the crank 65a, movement of the lever 73 being accommodated by the interruption 71 in the locking cam 70. As the lever 73 rotates, the tray shift bar 76 and slide block 77 swing the bearing blocks 62a, 62b, the tray guide bars 64 and thus the carrier tray 40 about the shaft 55 to the right in FIG. 2, the locking cam 70 then riding in the adjacent lever recess 72. Continued rotation of the shaft 55 in the same direction causes the cranks 65a, 65b and the link bars 67 to move the carrier tray 40 upwards on the guide bars 64 in the plane B—B shown in FIG. 3 and along an inclined panel 79 at the lower edge of the housing opening 14 parallel to the plane B—B. The tray 40 is then in a position forward of and parallel to the receiver housing 20 to present a carrier 80 in the tray 40 to a customer through the housing opening 14. Reversal of the motor 58 will reverse the procedure, first lowering the carrier tray 40 in the plane B—B and then elevating it in the plane A—A to the receiver housing 20 to close the receiver 12. The two planes A—A, B—B intersect at the axis of the drive shaft 55 about which the tray 40 tilts back and forth as the receiver 12 opens and closes. In a commercial embodiment of the invention the included angle between the two planes is 32 degrees.

As the carrier tray 40 engages the receiver housing 20 to close the receiver 12, the resilient mounting of the tray 40 relative to the tray mounting bars 45, by virtue of the coil springs 47, is activated. That in turn compensates for any minor misalignment between the housing 20 and tray 40 owing to production variances in the manufacture and installation of the parts concerned, all so that the tray 40 will so far as possible uniformly engage the receiver housing seal 35 to render the joint between the housing 20 and tray 40 air-tight. The splayed housing flanges 34 and tray end walls 43 not only reduce sliding contact between the housing 20 and tray 40 and thus wear on the seal 35 at those points as the receiver 12 is opened and closed, but also provide better sealing than if the housing flanges 34 and tray end walls 43 were perpendicular to the axis of the carrier chamber.

The location of the ports 22 in the receiver housing 20 midway along the carrier chamber, rather than at its far end through the bumper 26, reduces the shock of an arriving carrier 80 inasmuch as once its leading seal ring 81 passes the ports 22, an air cushion is formed between the leading seal ring 81 and the bumper 26 before the carrier 80 strikes the latter. When pressurized air is supplied by the blower 39 through the pipe 38, duct 36 and plenum chamber 31 to the ports 22 in order to dispatch the carrier 80 from the receiver 12, the air acts against the then leading seal ring 81 to move the carrier 80 until the then trailing seal ring 81 passes the ports 22. A large number of small ports 22 are preferred rather than a single large one in order to prevent loose papers, coins and the like in the transit tube 11 from being sucked from the carrier chamber into the blower 39 when it is reversed to send the carrier 80 from the teller terminal (not shown) to the customer terminal. Other details of the customer terminal, such as the various sensors, switches, and the electric "logic" involved in its structure and operation are all conventional and well within the skill of the art to provide, so are not here described since they are independent of the present invention.

Lastly, though the invention has been described in terms of a particular embodiment, being the best mode known of carrying out the invention, it is not limited to that embodiment alone. Rather, the following claims are to be read as encompassing all adaptations and modifications of the invention falling within its spirit and scope.

We claim:

1. In a customer terminal for a single tube pneumatic system for banking or the like in which a cylindrical carrier is transmitted between the customer terminal and a teller terminal through an interconnecting carrier transit tube, the carrier having annular sealing means adjacent each end for pneumatically sealing the carrier with respect to the transmit tube, the customer terminal including a two-piece carrier receiver for receipt and dispatch of the carrier, the receiver having a fixed upper portion constituting a carrier housing and a movable lower portion constituting a carrier tray for supporting the carrier, the carrier housing and tray having partial cylindrical walls together defining an interior cylindrical carrier chamber within the receiver when the carrier housing and tray are in a closed portion forming the carrier receiver, the carrier housing and tray having mating edge portions when in their closed position, and means effective to open and close the carrier receiver, the improvement wherein said means opens the receiver by moving the carrier tray downwardly in a first plane through the axis of said chamber and thence upwards in a second plane inclined with respect to the first plane so that the carrier tray is disposed laterally to one side of the carrier housing in a position presenting a carrier in the tray to a customer, said means closing the receiver by moving the carrier tray downwardly in the second plane and then upwardly in the first plane, the carrier tray remaining longitudinally parallel to the carrier housing throughout said movements.

2. The terminal of claim 1 wherein the carrier housing includes the axial end walls of said chamber, one of said end walls having a co-axial opening for a carrier transit tube, the opposite axial end wall of said chamber being at least partially formed by bumper means to mitigate the shock of a carrier arriving in said chamber; and including pneumatic exhaust and intake ports in the cylindrical wall of the carrier housing and disposed intermediate said tube opening and said bumper means effective to provide an air cushion for the carrier when arriving in said chamber once the annular sealing means adjacent the leading end of the carrier has past said ports.

3. The terminal of claim 2 wherein one of the carrier housing and tray mating edges are provided with sealing means effective to sealingly engage the tray with the housing when in their closed position; and including resilient means carried adjacent the opposite longitudinal ends of the carrier tray effective when activated to urge the tray into said sealing engagement when the receiver is in its closed position, the opening and closing means activating the resilient means at the upper end of the upward movement in said first plane.

4. The terminal of claim 3 wherein said mating edges of the carrier housing and tray include longitudinal edges extending parallel to the axis of said chamber and disposed intermediate transverse edges with respect to said axis extending from the ends of the longitudinal edges in splayed apart relation to each other.

5. The terminal of claim 4 wherein when the receiver is closed the carrier tray is symmetrical with respect to said first plane; and wherein the opening and closing means includes a motor driven drive shaft mounted in the terminal below the carrier receiver and parallel to said planes and the axis of said chamber; a pair of parallel tray guide bars extending upwardly in said first plane when the receiver is closed from a pair of bearing blocks journaled on the drive shaft adjacent its ends, the guide bars being slidably received in the carrier tray outboard of the axial ends of said tray wall; a pair of parallel, equal length link bars having upper ends pivoted to the longitudinal ends of the carrier tray about an axis in said first plane when the receiver is closed, the lower ends of the link bars being pivoted about an axis to the outer ends of a pair of parallel equal length cranks fixed at their inner ends to and extending upwardly from the drive shaft, both of the link bar pivot axes being parallel to that of said shaft, the pivot at the outer end of one of the cranks including a shift lever driver extending from the crank co-axial with the pivot; a carrier tray shift lever for shifting the tray between said planes during said movement thereof, the lever being a sector shaped plate having a periphery radially disposed with respect to a center on the plate, the periphery of the plate having a pair of adjacent arcuate recesses therein of equal radii subtended by minor chords, the two recesses being peripherally separated by a slot opening through and extending radially inwards from the periphery of the lever, the lever being disposed below said driver and pivoted at said center thereof to the terminal about an axis parallel to that of the drive shaft; a circular shift lever locking cam fixed relative to and co-axial with said shaft adjacent said one crank for rotation therewith and having a radius equal to that of the shift lever recesses, the periphery of the locking cam seating in one of said recesses, the location of the locking cam relative to the shift lever being such that one full rotation of said one crank and the lever locking cam in one direction relative to the shift lever will cause said driver to engage the slot between said recesses and thereby rotate the shift lever about said center thereof to thereafter dispose the lever locking cam in the other of said recesses, the lever locking cam having a relief in its periphery disposed to allow said rotation thereof relative to the shift lever; and a tray shift bar extending downwards from the bearing block adjacent said one crank and co-axial with the guide bar thereof, the lower end of the shift bar being slidably received in a locating block pivoted to the shift lever radially inwards of said slot thereof about an axis parallel to that of the drive shaft, whereby, when the receiver is closed, partial rotation of the drive shaft in one direction will move the carrier tray downwardly in said first plane to open the receiver, further rotation of the drive shaft in said direction will thence move the carrier tray upwardly in said second plane to present a carrier in the tray, thereafter partial rotation of the drive shaft in the opposite direction will move the carrier tray downwardly in the second plane, and further rotation of the drive shaft in said opposite direction will move the carrier tray upwards in said first plane to close the receiver.

6. The terminal of claim 5 wherein the upper ends of said link bars are pivoted to the longitudinal centers of a pair of cross plates adjacent the longitudinal ends of the carrier tray, the longitudinal ends of the cross plates being interconnected by a pair of parallel carrier tray mounting bars extending longitudinally of the carrier tray, the cross plates and mounting bars being symmetrically disposed relative to said first plane, the mounting bars being loosely received in bores in the carrier tray below said tray wall and parallel to said drive shaft, the carrier tray having a pair of blind bores opening downwards onto each mounting bar adjacent the longitudinal ends of the carrier tray, the axes of said bores being parallel to said first plane when the receiver is closed and intersecting the axis of their respective mounting bars, a compressible coil spring disposed in each of said bores at its blind end, and a plug slidably disposed in each of said bores between the spring and the mounting bar therebelow, said springs constituting said resilient means.

7. In a carrier receiver for a single tube pneumatic system for banking and the like, the receiver including an inner cylindrical chamber having opposite ends, one end being open for receiving into the chamber a cylindrical carrier having annular sealing means adjacent each end for pneumatically sealing the carrier with respect to the tube, the other end of the chamber having bumper means for arresting an incoming carrier, the improvement comprising a plurality of pneumatic intake and exhaust ports through the cylindrical wall of the chamber, the ports being restricted in size to prevent coins, bits of paper and other small items in the chamber from passing through the ports owing to the exhausting of air from the chamber when dispatching a carrier from the receiver, and disposed intermediate said ends of the chamber effective to provide an air cushion for an incoming carrier after the annular seal adjacent the leading end of the carrier has passed said ports.

8. The carrier receiver of claim 7 wherein the receiver comprises a two-piece receiver having a fixed portion constituting a carrier housing and a movable portion constituting a carrier tray for supporting a carrier when the receiver is operatively positioned, the carrier housing and tray each having inner partial cylindrical walls defining said chamber, the carrier housing including said ends of the receiver and said ports, the carrier housing and tray having mating edges equipped with sealing means for pneumatically sealing the tray to the housing for dispatch and receipt of a carrier by the receiver; and including means operatively associated with the carrier tray for moving the tray relative to the carrier housing between a receiver closed position and a receiver open position in which the tray is disposed laterally to one side of the housing and longitudinally parallel thereto to present a carrier on the tray to a customer.

9. The carrier receiver of claim 8 wherein said mating edges include longitudinal edges extending parallel to the axis of said chamber and disposed between transverse edges with respect to said axis extending from the ends of the longitudinal edges in splayed relation to each other; and wherein the carrier tray includes means adjacent the longitudinal ends of the tray and operatively associated with said moving means for resiliently urging the tray into said sealing engagement when the receiver is in its closed position.

* * * * *